United States Patent
Segawa

(10) Patent No.: US 8,818,631 B2
(45) Date of Patent: Aug. 26, 2014

(54) VEHICLE STEERING CONTROL UNIT

(75) Inventor: Masaya Segawa, Yamatokoriyama (JP)

(73) Assignee: JTEKT Corporation, Osaka-shi (JP)

( * ) Notice: Subject to any disclaimer, the term of this patent is extended or adjusted under 35 U.S.C. 154(b) by 634 days.

(21) Appl. No.: 12/515,679

(22) PCT Filed: Nov. 16, 2007

(86) PCT No.: PCT/JP2007/072278
§ 371 (c)(1),
(2), (4) Date: Jul. 23, 2009

(87) PCT Pub. No.: WO2008/062726
PCT Pub. Date: May 29, 2008

(65) Prior Publication Data
US 2010/0023215 A1    Jan. 28, 2010

(30) Foreign Application Priority Data

Nov. 20, 2006  (JP) ............................... P2006-312413

(51) Int. Cl.
*B62D 6/00* (2006.01)

(52) U.S. Cl.
USPC ......................................................... 701/41

(58) Field of Classification Search
USPC ................ 701/1, 36, 41, 48; 280/5.501, 5.51; 340/438, 439
See application file for complete search history.

(56) References Cited

U.S. PATENT DOCUMENTS

| | | | | |
|---|---|---|---|---|
| 6,631,782 | B1* | 10/2003 | Rieger | 180/446 |
| 2001/0054841 | A1* | 12/2001 | Ross et al. | 303/20 |
| 2002/0087241 | A1* | 7/2002 | Nakano et al. | 701/41 |
| 2004/0167678 | A1* | 8/2004 | Frank et al. | 701/1 |
| 2005/0209742 | A1* | 9/2005 | Sakakibara et al. | 701/1 |
| 2006/0047381 | A1* | 3/2006 | Nguyen | 701/29 |
| 2006/0167600 | A1* | 7/2006 | Nelson et al. | 701/23 |

FOREIGN PATENT DOCUMENTS

| | | |
|---|---|---|
| JP | 7 9925 | 1/1995 |
| JP | 2004 532155 | 10/2004 |
| JP | 2005 238950 | 9/2005 |

* cited by examiner

*Primary Examiner* — Thomas Black
*Assistant Examiner* — Ce Li
(74) *Attorney, Agent, or Firm* — Oblon, Spivak, McClelland, Maier & Neustadt, L.L.P.

(57) ABSTRACT

A vehicle steering control unit which can implement various type of self-tuning in accordance with various properties of an objective vehicle is realized. ECU includes a control information acquiring part 501 which acquires control information which is information relating to the controlling of steering of the vehicle, a parameter value calculation part 502 which calculates after-change values for parameters whose values need to be changed in various steering control parameters based on the control information acquired by the control information acquiring part 501, and a parameter value rewrite part 503 which rewrites the values of steering control parameters. The control information includes information representing system properties of an objective vehicle, information retained by the chassis control system, and information on elements which make up a steering system which is installed on the objective vehicle.

5 Claims, 6 Drawing Sheets

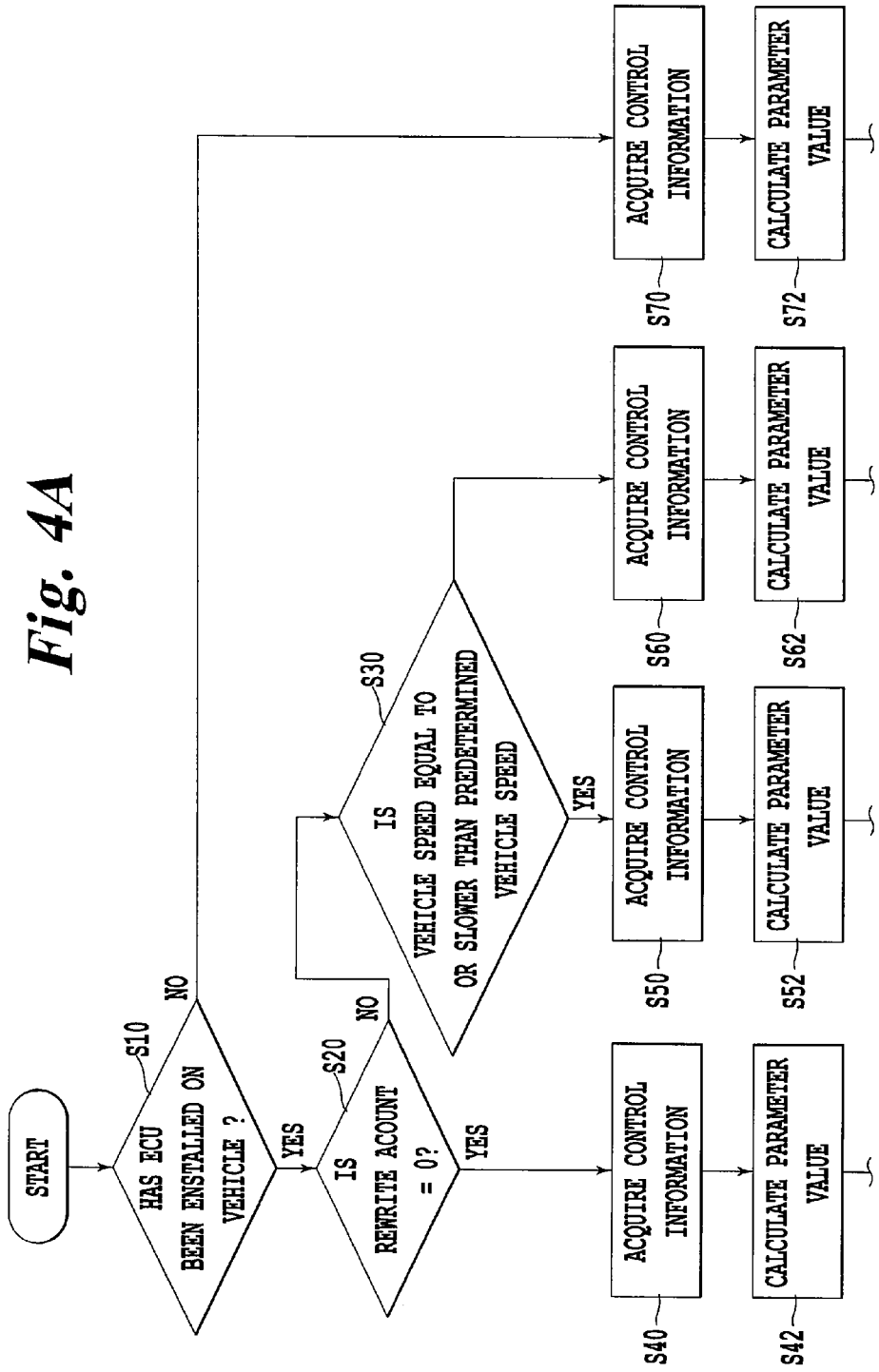

VEHICLE STEERING CONTROL UNIT

TECHNICAL FIELD

The present invention relates to a vehicle steering control unit and more particularly to tuning of a vehicle steering control unit.

BACKGROUND ART

Conventionally, a unit for controlling the steering of a vehicle such as a motor vehicle (hereinafter, referred to as a "vehicle steering control unit") has been equipped on the vehicle. For example, in a vehicle steering control unit provided in an electric power steering system, a steering torque added to a steering wheel is detected, so that a motor is driven in accordance with the magnitude of the torque. It has been proposed to provide a vehicle steering control unit like this with a function to implement an automatic tuning in accordance with a change in environment such as temperature or a change in properties of steering components (for example, a change in properties due to deterioration) (hereinafter, referred to as a "self-tuning function"). In the event that the vehicle steering control unit includes a self-tuning function like this, the control of steering of a vehicle is allowed to be implemented easily and preferably even though a change in environment or the like happens.

In addition, JP-T-2004-532155 (the term "JPT" as used herein means a published Japanese translation of a PCT patent application) discloses inventions of method and apparatus for adjusting dynamically constituent components of a vehicle (brake, power steering system and the like of vehicle).
Patent Document 1: JP-T-2004-532155

DISCLOSURE OF THE INVENTION

Problem that the Invention is to Solve

According to the self-tuning function that has conventionally been proposed, however, although various types of tuning are implemented in accordance with a change in environment or a change in properties of steering components as described above, no tuning in accordance with properties of individual vehicles (hereinafter, referred to as "objective vehicles") on which the vehicle steering control unit is equipped is implemented. In addition, according to the conventionally proposed self-tuning function, although various types of tuning by the single unit as the vehicle steering control unit is implemented, no tuning in accordance with an (individual) objective vehicle is implemented when the vehicle steering control unit is installed on (assembled to) the vehicle. Because of this, in a case where the properties of objective vehicles vary from vehicle to vehicle, that is, in a case where there are a plurality of grades or variants in a single vehicle line, vehicle steering control units or control algorithms have had to be prepared individually for different properties/grades. In addition, where optional equipment such as, for example, a skid control system is available, a vehicle steering control unit or control algorithm has had to be prepared for the optional equipment. This will be described below by reference to FIG. 6. Note that when used in the following description, a "system" means a system for controlling the steering of a vehicle as referred to as a "column-type electric power steering system of an X company" or a "rack-and-pinion type hydraulic power steering system of a Y company." In addition, in FIG. 6, a "vehicle steering control unit" will be described briefly as a "controller."

When, for example, a "vehicle A" including a "system A" is realized, as is shown in FIG. 6(a), the "system A," a "controller A" for the system A and a "control law group A" which is a group of various control laws that are used by the controller A become necessary. In addition, the control laws mean laws used when controlling the steering of a vehicle such as "assist properties" in a steering system, "whether or not a steering wheel return control is to be implemented" or the like. Here, in a case where a "steering angle sensor" is added to the "vehicle A" as optional equipment, a control law for a control which employs steering angles obtained by the steering angle sensor becomes necessary. Consequently, as is shown in FIG. 6(b), a "control law group A'" becomes necessary in which a control law associated with the addition of the steering angle sensor is added to the control law group A, and a "controller A'" becomes necessary which employs the control law group A'. Namely, even though the systems installed on the vehicles remain the same, the different control units become necessary to be installed on the vehicles depending upon whether or not the vehicles are fitted with the optional equipment.

In addition, in a case where a "vehicle B" which includes a "system B" is realized, as is shown in FIG. 6(c), the system B, a "controller B" for the system B and a "control law group B" which is used by the controller B become necessary. In this way, in the event that the systems which are installed on the vehicles become different, the different controllers and control law groups become necessary.

Further, in a case where a "vehicle C" which includes the "system B" which employs a different motor from the one installed on the vehicle B is realized, as is shown in FIG. 6(d), a "controller C" becomes necessary which is different from the controller B installed on the vehicle B. Namely, even though the systems installed on the vehicles remain the same, in the event that the motors used in the systems become different, the different controllers become necessary.

Thus, as has been described above, conventionally, the idea that a vehicle steering control unit implements various types of tuning which match various types of vehicles has not yet been realized, and different vehicle steering control units have had to be prepared depending upon grades of an objective vehicle or whether or not the objective vehicle is equipped with an optional component.

Then, an object of the invention is to realize a vehicle steering control unit which can implement various type of self-tuning in accordance with various properties of an objective vehicle.

Means for Solving the Problem

A first invention provides a vehicle steering control unit for controlling the steering of a vehicle, comprising:
a control parameter retaining unit for retaining, of control laws applicable to controlling the steering of the vehicle, those which are dependent on system properties of the vehicle as control parameters;
a control execution unit for controlling the steering of the vehicle in accordance with values of the control parameters;
a control information acquiring unit for acquiring control information including installed vehicle information which is information representing system properties of the vehicle; and
a control parameter value changing unit for changing the values of the control parameters based on the control information.

A second invention provides a vehicle steering control unit as set forth in the first invention which is installed in a vehicle including a chassis control system, characterized in that the control information acquiring unit acquires further information retained by the chassis control system as the control information, in that the control parameter retaining unit retains further those of the control laws which are dependent on states of the chassis control system, and in that the control parameter value changing unit refers to the installed vehicle information in preference to the information retained by the chassis control system when changing the values of the control parameters.

A third invention provides a vehicle steering control unit as set forth in the first invention, characterized in that the control information acquiring unit acquires further system constituent element information which is information on an element making up a steering system installed on the vehicle as the control information, in that the control parameter retaining unit retains further those of the control laws which are dependent on the system constituent element information as the control parameters, and in that the control parameter value changing unit refers to the system constituent element information in preference to the installed vehicle information when changing the values of the control parameters for the first time since the vehicle steering control unit has been installed on the vehicle, and refers to the installed vehicle information in preference to the system constituent element information when changing the values of the control parameters for the second and later times since the vehicle steering control unit has been installed on the vehicle.

A fourth invention provides a vehicle steering control unit as set forth in the third invention which is installed on a vehicle including a chassis control system, characterized in that the control information acquiring unit acquires further information retained by the chassis control system as the control information, in that the control parameter retaining unit retains further those of the control laws which are dependent on the information of the chassis control system, and in that the control parameter value changing unit refers to the installed vehicle information in preference to the information retained by the chassis control system when changing the values of the control parameters for the first time since the vehicle steering control unit has been installed on the vehicle, and refers to the installed vehicle information in preference to the information retained by the chassis control system when changing the values of the control parameters for the second and later times since the vehicle steering control unit has been installed on the vehicle.

Advantage of the Invention

According to the first invention, the portion of the control law for controlling the vehicle which relates to the system property of the vehicle itself on which the vehicle steering control unit is installed is made into a parameter, and the value of the control parameter is changed in accordance with the system property. Because of this, the same vehicle steering control unit can be used for vehicles having different system properties. By this, the necessity is obviated of preparing different vehicle steering control units for vehicles which are different in grade or depending upon whether or not the vehicles have optional equipment.

According to the second invention, the value of the control parameter is also changed based on the information retained by the chassis control system. Because of this, a control of steering of a vehicle which is linked with the chassis control system is enabled, whereby the vehicle steering control unit is realized by which a more preferable steering feel can be obtained.

According to the third invention, the value of the control parameter is also changed based on the system constituent element information which is the information of the element which makes up the steering system. In addition, when the tuning is implemented for the first time since the vehicle steering control unit has been installed on the vehicle, the system constituent element information is referred to for preference, while when the tuning is implemented after the vehicle has been put to use, the system property of the vehicle on which the vehicle steering control unit is installed is referred to for preference. Because of this, at the time of the initial tuning, the tuning is implemented so that the performance of the steering system is enhanced effectively, and at the time of the tuning implemented after the vehicle has been put to use, the tuning is implemented which takes into consideration individual vehicle conditions at a point in time when the vehicle is actually being used (driven) or deterioration of the constituent components. By this, a more preferred tuning is implemented at each point in time, whereby the user can obtain a comfortable steering feel.

According to the fourth invention, the value of the control parameter is also changed based on the information retained by the chassis control system. Because of this, a control of steering of a vehicle which is linked with the chassis control system is enabled, whereby the vehicle steering control unit is realized by which a more preferable steering feel can be obtained.

BEST MODE FOR CARRYING OUT THE INVENTION

Hereinafter, an example in which a vehicle steering control unit according to the invention is applied to an electric power steering system will be described as an embodiment.

<1. Overall Configuration>

Figure 1:
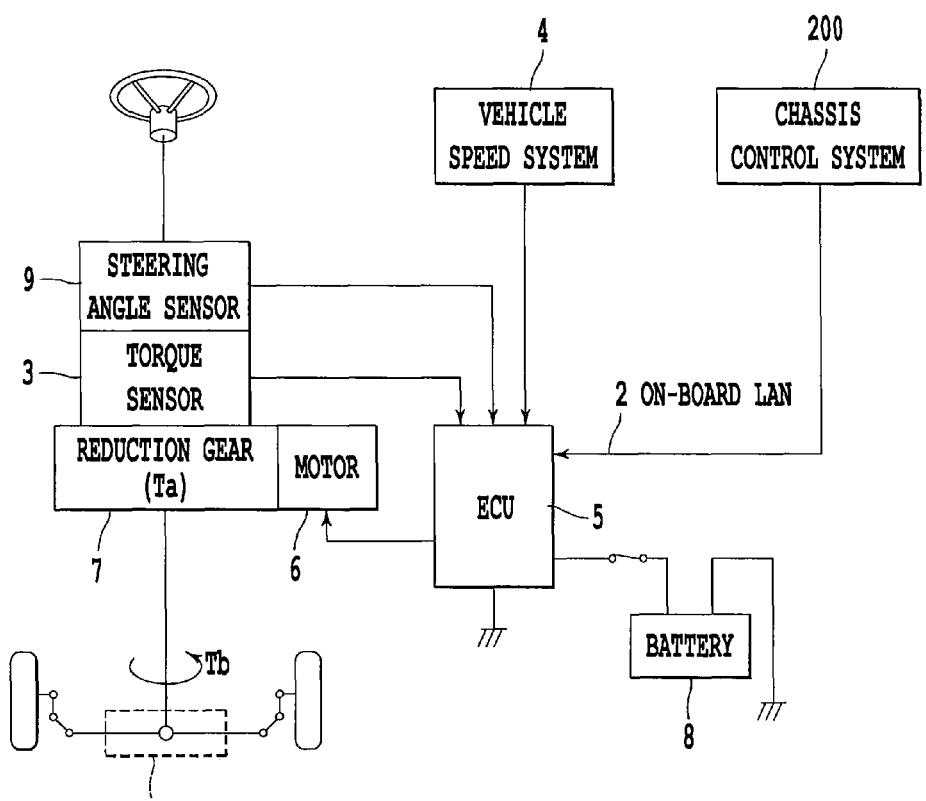
FIG. 1 is a schematic diagram which depicts the configuration of an electric power steering system including an electronic control unit which is a vehicle steering control unit according to an embodiment of the invention, together with a vehicle configuration which relates to the same electric power steering system.

FIG. 1 is a schematic diagram which depicts the configuration of an electric power steering system including an electronic control unit which is a vehicle steering control unit according to an embodiment of the invention, together with a vehicle configuration which relates to the same electric power steering system. This electric power steering system includes a steering shaft 102 which is secured at one end thereof to a steering wheel 100 as a steering device for steering a vehicle, a rack-and-pinion mechanism 104 which is coupled to the other end of the steering shaft 102, a torque sensor 3 for detecting a steering torque which is added to the steering shaft 102 by operation of the steering wheel 100, a vehicle speed sensor 4 for detecting a running speed of the vehicle, a steering angle sensor 9 for detecting an angle through which the steering wheel 100 is turned or a steering angle thereof, an electric motor 6 for generating a steering assist force for reducing an effort to be made by the driver in turning the steering wheel, a reduction gear 7 for transmitting the steering assist force generated by the motor 6 to the steering shaft 102, and an ECU 5 adapted to receive a power supply from an on-board battery 8 for controlling the drive of the motor 6 based on sensor signals from the torque sensor 3, the steering angle sensor 9 and the vehicle speed sensor 4. In addition, in the vehicle, the ECU 5 is connected with a chassis control system 200 which makes up a chassis control system by an on-board LAN 2.

When the driver turns the steering wheel 100, the motor 6 is driven by the ECU 5 based on a steering torque Ts detected by the torque sensor 3, a steering angle detected by the steering angle sensor 9, and a vehicle speed detected by the vehicle speed sensor 4. By this, the motor 6 generates a steering assist force, and this steering assist force is added to the steering shaft 102 via the reduction gear 7, whereby the steering effort by the driver is reduced. Namely, a sum of the steering torque Ts added by the operation of the steering wheel and the steering assist force Ta generated by the motor 6 is given to the rack-and-pinion mechanism 104 via the steering shaft 102 as an output torque Tb.

In addition, the ECU 5 retains various control laws for controlling the steering of the vehicle and various parameters for determining the type of control to be implemented based on those control laws (hereinafter, referred to as "steering control parameters"). As will be described later, an automatic tuning is implemented on the steering control parameters in accordance with system properties of the vehicle on which this ECU 5 is installed. In addition, the system properties of the vehicle are such as to indicate respective properties of individual systems which are installed on the vehicle such as the steering system and the like and there is raised, for example, a torque control gain which is used in controlling the electric power steering system.

<2. Configuration of ECU>
<2.1 Hardware Configuration>

Figure 2:
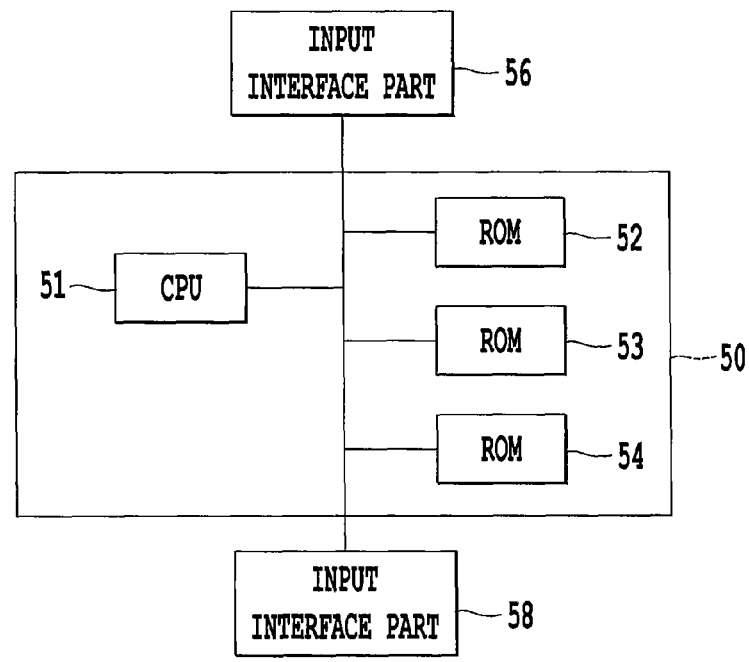
FIG. 2 is a block diagram which depicts a hardware configuration of the ECU of the embodiment.

FIG. 2 is a block diagram which depicts a hardware configuration of the ECU 5 of the embodiment. This ECU 5 includes a microcomputer 50, an input interface part 56 and a drive circuit 58. The input interface part 56 captures information necessary to control the drive of the motor such as sensor signals outputted from the various sensors attached to the vehicle and information necessary to determine values of steering control parameters into the microcomputer 50. The microcomputer 50 generates and outputs various control signals, and sets and changes values of steering control parameters based on information given from the input interface part 56. The drive circuit 58 drives actuators such as the electric motor 6 based on control signals outputted from the microcomputer 50.

The microcomputer 50 includes a CPU 51, a ROM (Read Only Memory), a RAM (Random Access Memory) 53 and an EEPROM (Electrically Erasable Programmable Read Only Memory: a ROM which can electrically be rewritten) 54. The CPU 51 implements an arithmetic operation according to an instruction given thereto. Specifically, the CPU 51 executes a program for generating a control signal to be given to the drive circuit 58 (hereinafter, referred to as a "control signal generation program") and a program for rewriting the values of steering control parameters (hereinafter, referred to as a "steering control parameter tuning program"). The ROM 52 stores the control signal generation program, the steering control parameter tuning program and control laws. The RAM 53 retains temporarily data which is necessary for work during the execution of the programs. The EEPROM 54 stores steering control parameters.

In addition, in this embodiment, the control parameter retaining unit is realized by the EEPROM 54.

<2.2 Software Configuration>

Figure 3:
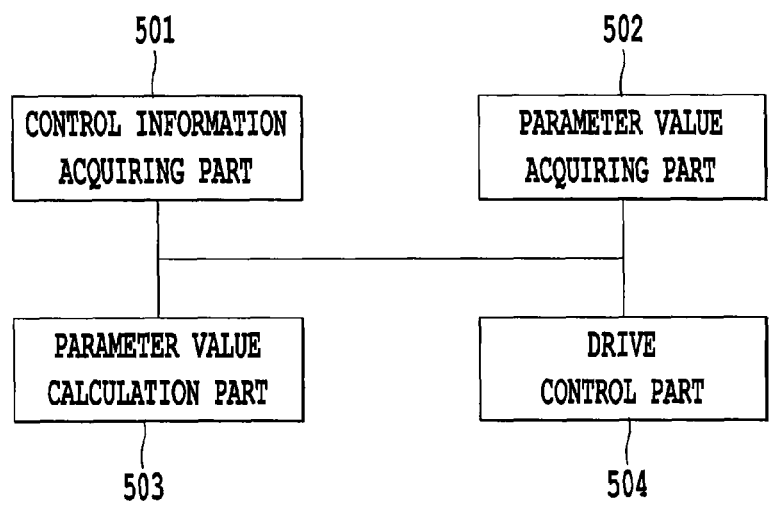
FIG. 3 is a function block diagram which depicts a software configuration of the ECU of the embodiment.

FIG. 3 is a function block diagram which depicts a software configuration of the ECU 5 of the embodiment. This ECU 5 includes, as constituent elements for realizing a function as software, a control information acquiring part 501, a parameter value calculation part 502, a parameter value rewrite part 503, and a drive control part 504.

The control information acquiring part 501 acquires control information which is information relating to the controlling of steering of the vehicle. This control information includes information representing system properties of an objective vehicle, information retained by the chassis control system, and information on elements (steering-related components) which make up a steering system (a system for controlling the steering of the vehicle such as, for example, a "column type electric power steering system by an X company" or a "rack-and-pinion type electric power steering system by a Y company") which is installed on the objective vehicle. The parameter value calculation part 502 calculates after-change values (parameter values) for parameters whose values need to be changed (hereinafter, referred to as "rewrite parameters") in various steering control parameters based on the control information acquired by the control information acquiring part 501. The parameter value rewrite part 503 rewrites the value of a rewrite parameter to the value calculated by the parameter value calculation part 502. The drive control part 504 generates and outputs a control signal for controlling the operation of the drive circuit 58.

In addition, in control laws for controlling the steering of the vehicle, control laws which are dependent on the system properties of the vehicle, the state of the chassis control system and the elements which make up the steering system are made into parameters by the steering control parameters. In addition, the steering control parameters include a steering control parameter in which a plurality of operation expressions are prepared in advance for determining control laws for the objective vehicle and an operation expression to be adopted is determined by the value of the steering control parameter and a steering control parameter in which part of an operation expression for determining control laws for the objective vehicle is made into coefficients or the like as steering control parameters.

In addition, in the embodiment, the control parameter value changing unit is realized by the parameter value calculation part 502 and the parameter value rewrite part 503, and the control execution unit is realized by the drive control part 504.

<3. Tuning Operation>

Figure 4B:
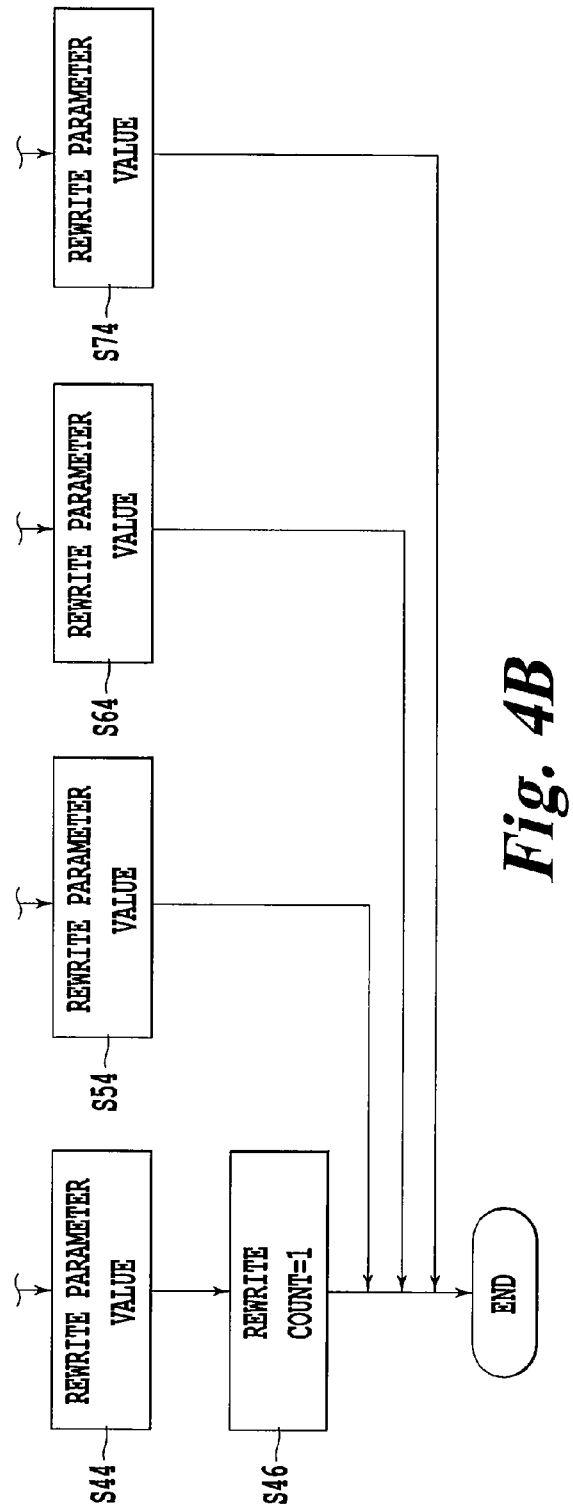
FIG. 4 is a flowchart which describes the operation of the ECU when a tuning operation is implemented in the embodiment.

Next, a tuning operation of the embodiment will be described. FIG. 4 is a flowchart which describes the operation of the ECU 5 when a tuning operation is performed. In addition, when used herein, the tuning operation unit a self-tuning by the ECU 5 which is the vehicle steering control unit, and specifically, the tuning operation unit that the values of the steering control parameters are changed based on control information. In addition, this tuning operation is implemented by the steering control parameter tuning program stored in the ROM 52 being loaded on the RAM 53 and the CPU 51 executing the steering control parameter tuning program.

<3.1 Determination of State>

When the ECU 5 starts to operate, it is determined whether or not the ECU 5 has already been installed on the vehicle (step S10). If it is determined as a result of the determination that the ECU 5 has already been installed on the vehicle, the flow of operation proceeds to step S20. On the other hand, if the ECU 5 has not yet been installed on the vehicle, the flow of operation proceeds to step S70.

In step S20, it is determined whether or not a rewrite count is "0." When used herein, the "rewrite count" indicates "whether or not the value of the control parameter has been rewritten after the ECU 5 has been installed on the vehicle." Here, if the rewrite count is "1," it means that rewriting of the value has been implemented, while if the rewrite count is "0," it means that no rewriting of the value has been implemented. If it is determined as a result of the determination in step S20 that the rewrite count is "0," the flow of operation proceeds to step S40. On the other hand, if the rewrite count is not "0," the flow of operation proceeds to step S30. Note that the rewrite count is set in advance to "0" when an ECU 5 is installed on a vehicle.

In step S30, it is determined whether or not the speed of an objective vehicle is equal to or slower than a predetermined vehicle speed. Note that when used herein, the "predetermined speed" is preferably an extremely low speed such as on the order of 10 km/h. If it is determined as a result of the determination that the vehicle speed is equal to or slower than the predetermined speed, the flow of operation proceeds to step S50. On the other hand, if it is determined that the vehicle speed is not slower than the predetermined speed, the flow of operation proceeds to step S60.

<3.2 Tuning Operation Before Installation of ECU 5 on Vehicle>

In the event that no ECU 5 has been installed on the vehicle, as has been described above, after the end of step S10, the flow of operation proceeds to step S70. In step S70, control information necessary to calculate a rewrite parameter value is acquired by the control information acquiring part 501. In addition, in step S70, information on an element (a steering-related component or the like) which makes up a steering system realized by the ECU 5 (hereinafter, referred to as "system constituent element information") is acquired as control information. After the end of step S70, the flow of operation proceeds to step S72.

In step S72, the parameter value calculation part 502 calculates a value for the rewrite parameter based on the control information acquired in step S70. Here, as the rewrite parameter, there are raised a parameter representing a current responding property and a motor parameter. After the end of step S72, the flow of operation proceeds to step S74. In step S74, the value of the rewrite parameter is rewritten to the value calculated in step S72 by the parameter value rewrite part 503. By this series of operations, the tuning operation before the installation of the ECU 5 on the vehicle is ended.

<3.3 Initial Tuning Operation after Installation of ECU on Vehicle>

When an initial tuning operation after the installation of the ECU 5 on the vehicle (hereinafter, referred to as an "initial tuning operation") is implemented, after the end of step S20, the flow of operation proceeds to step S40. In step S40, control information necessary to calculate a value for the rewrite parameter is acquired by the control information acquiring part 501. Here, the control information includes information representing the system properties of the objective vehicle (hereinafter, referred to as "installed vehicle information"), the aforesaid system constituent element information and information retained by the chassis control system. After the end of step S40, the flow of operation proceeds to step S42.

In step S42, the parameter value calculation part 502 calculates a value for the rewrite parameter based on the control information acquired in step S40. Here, with attention paid to a certain rewrite parameter, in the event that there exist a plurality of pieces of information which affect the value of the rewrite parameter, the control information is to be referred to in the following order of priority. When control information to be referred to is arranged in the order of decreasing priority, there are "the system constituent element information, the installed vehicle information and the information retained by the chassis control system." In addition, the rewrite parameter here includes a parameter representing, for example, a torque control gain. After the end of step S42, the flow of operation proceeds to step S44.

In step S44, the parameter value rewrite part 503 rewrites the value of the rewrite parameter to the value calculated in step S42. After the end of step S44, the flow of operation proceeds to step S46. In step S46, "1" is substituted in the aforesaid rewrite count. This substitution ends the initial tuning operation.

<3.4 Tuning Operation while Vehicle being at Halt or Running at Predetermined Vehicle Speed or Slower>

When the initial tuning has been completed and the vehicle is at halt or running at the predetermined vehicle speed or slower (the extremely low speed), after the end of step S30, the flow of operation proceeds to step S50. In step S50, the control information acquiring part 501 acquires control information necessary to calculate a value for the rewrite parameter. Here, the control information includes installed vehicle information, system constituent element information and information retained by the chassis control system. After the end of step S50, the flow of operation proceeds to step S52.

In step S52, the parameter value calculation part 502 calculates a value for the rewrite parameter based on the control information obtained in step S50. Here, with attention paid to a certain rewrite parameter, in the event that there exist a plurality of pieces of information which affect the value of the rewrite parameter, the control information is to be referred to in the following order of priority. When control information to be referred to is arranged in the order of decreasing priority, there are "the installed vehicle information, the system constituent element information, and the information retained by the chassis control system." In addition, the rewrite parameter here includes a parameter representing a tire size, a parameter representing the number of seats of the vehicle, a parameter representing the arrangement of occupants within a passenger compartment and the like. After the end of step S52, the flow of operation proceeds to step S54. In step S54, the value of the rewrite parameter is rewritten to the value calculated in step S52.

<3.5 Tuning Operation while Vehicle Running at Vehicle Speed Exceeding Predetermined Vehicle Speed>

When the initial tuning has been completed and the vehicle is running at speeds which are faster than the predetermined vehicle speed, after the end of step S30, the flow of operation proceeds to step S60. In step S60, the control information acquiring part 501 acquires control information necessary to calculate a value for the rewrite parameter. Here, the control information includes installed vehicle information, system constituent element information, information retained by the chassis control system. After the end of step S60, the flow of operation proceeds to step S62.

In step S62, the parameter value calculation part 502 calculates a value for the rewrite parameter based on the control information acquired in step S60. Here, with attention paid to a certain rewrite parameter, in the event that there exist a plurality of pieces of information which affect the value of the rewrite parameter, the control information is to be referred to in the following order of priority. When control information to be referred to is arranged in the order of decreasing priority, there are "the installed vehicle information, the system constituent element information, and the information retained by the chassis control system." In addition, the rewrite parameter here includes a parameter representing, for example, a posture stabilization gain. After the end of step S62, the flow of operation proceeds to step S64. In step S64, the parameter value rewrite part 503 rewrites the value of the rewrite parameter to the value calculated in step S62.

<4. Advantage>

Thus, as has been described heretofore, according to the embodiment, the values of the steering control parameters used by the ECU 5 are changed based on the installed vehicle information representing the system properties or the like of the objective vehicle, the system constituent element information of the steering system installed on the objective vehicle and the information retained by the chassis control system. Because of this, the values of the steering control parameters can be changed not only before the installation of the ECU 5 on the vehicle but also after the installation of the ECU 5 on the vehicle. By this configuration, by the control laws being made into the parameters, the control laws can commonly be used among different vehicles. As a result, the necessity is obviated of preparing different ECU's 5 in accordance with, for example, grades of a vehicle or depending upon whether or not the vehicle has optional equipment, and hence, an ECU 5 only needs to be prepared for each steering system. By this, the number of ECU's 5 which need to be lined up for preparation as vehicle steering control units can be reduced.

Figure 5:
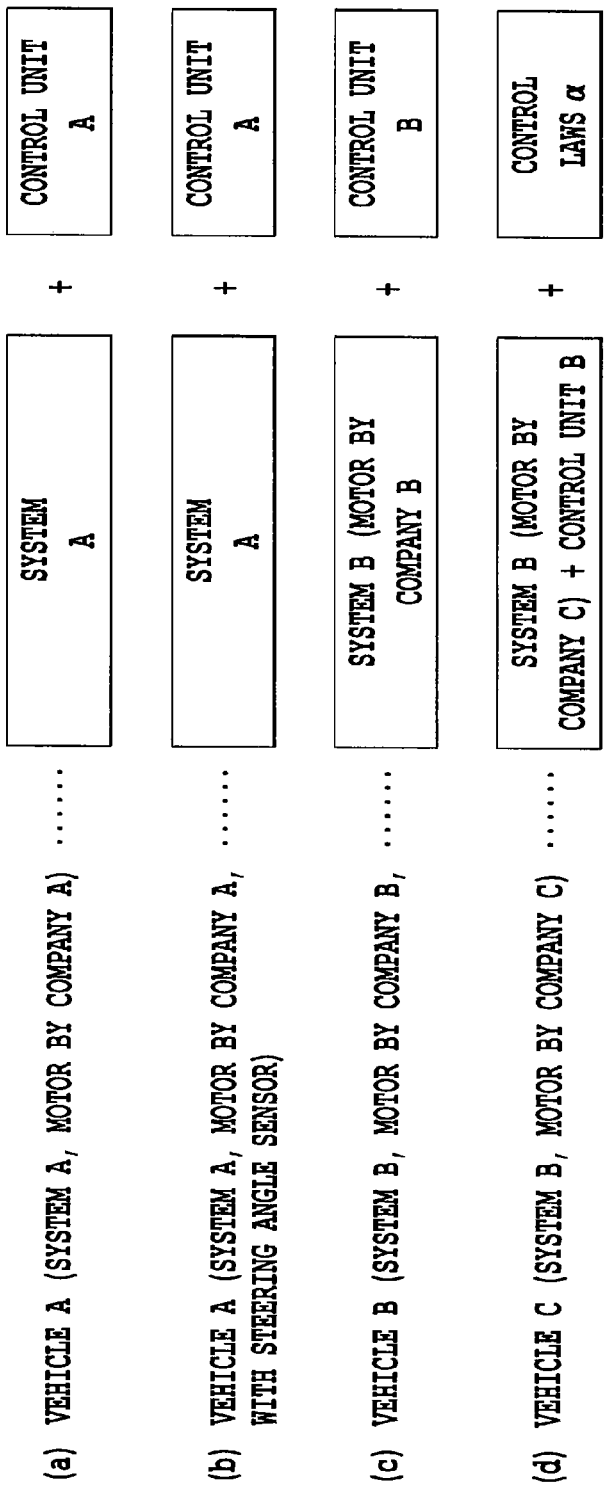
FIG. 5 is a diagram which explains an advantage of the embodiment.
Figure 6:
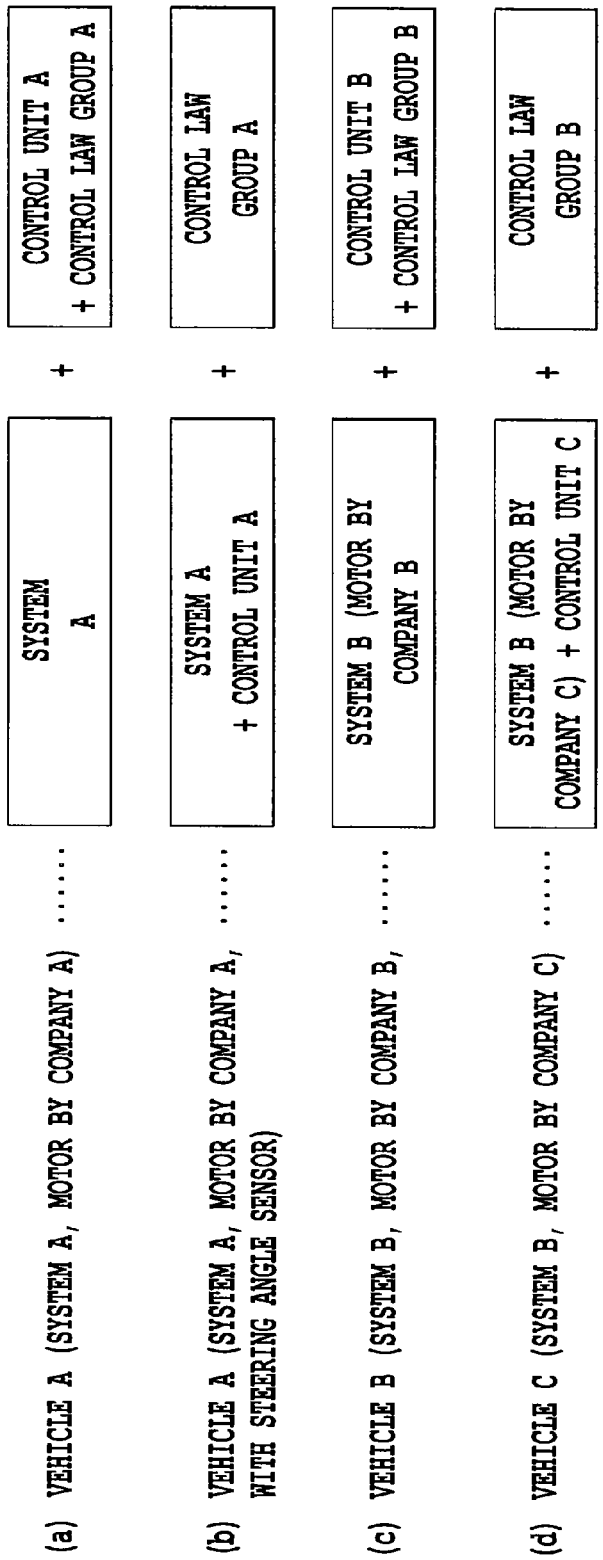
FIG. 6 is a diagram which describes a conventional example.

FIG. 5 is a diagram which describes advantages of the embodiment. For example, when realizing a "vehicle A" (with no optional equipment) which includes a "system A" and a "vehicle A" in which a "steering angle sensor" is added to the "system A" as optional equipment, the control laws can commonly be used between the two vehicles as has been described above. In addition, both the vehicles have the "system A." Consequently, as is shown in FIGS. 5(a) and 5(b), the same "control unit (ECU) A" may only have to be prepared for both the vehicles.

Further, also when realizing a "vehicle B" (employing a motor of a "b" company) which includes a "system B" and a "vehicle C" (employing a motor by a "c" company) which includes the "system B," as has been described above, the control laws can commonly be used between the two vehicles. In this case, since the "system B" is installed in both the "vehicle B" and the "vehicle C," as is shown in FIGS. 5(c) and 5(d), the same "control unit B" may only have to be prepared for both the vehicles.

In addition, when performing the initial tuning operation, the control information is referred to in the following order of priority: the system constituent element information; the installed vehicle information; the information retained by the chassis control system. Because of this, the tuning of the ECU 5 is implemented so as to enhance effectively the performance of the steering system. On the other hand, after the end of the initial tuning operation, the control information is referred to in the following order of priority: the installed vehicle information; the system constituent element information; the information retained by the chassis control system. Because of this, the tunings are implemented which take into consideration the individual conditions of the vehicle at a point in time when the vehicle is actually used (driven), the deterioration of the constituent components and the like. By this configuration, a more preferable tuning is implemented at each point in time, the user thereby being able to obtain a comfortable steering feel.

<5. Others>

While the example in which the vehicle steering control unit is applied to the electric power steering system has been described in the embodiment, the invention is not limited thereto. The invention can be applied to a system other than the electric power steering system such as a hydraulic power steering system.

The invention claimed is:

1. A vehicle steering control unit for controlling steering of a vehicle, which is installed on a vehicle including a chassis control system, comprising a computer including:
 a control parameter retaining unit for retaining parameters as control parameters that are dependent on system properties of the vehicle in control laws for controlling the steering of the vehicle;
 a control execution unit for controlling the steering of the vehicle in accordance with values of the control parameters;
 a control information acquiring unit for acquiring control information including installed vehicle information which represents the system properties of the vehicle, including information retained by the chassis control system; and
 a control parameter value changing unit for changing the values of the control parameters based on the control information,
 further comprising a determining unit for determining that the computer has been installed on a vehicle, wherein the control information acquiring unit is operative for acquiring the control information including installed vehicle information in response to a determination by the determining unit that the computer has been installed on a vehicle.

2. A vehicle steering control unit for controlling steering of a vehicle, which is installed on a vehicle including a chassis control system, comprising a computer including:
 a control parameter retaining unit for retaining parameters as control parameters that are dependent on system properties of the vehicle in control laws for controlling the steering of the vehicle;
 a control execution unit for controlling the steering of the vehicle in accordance with values of the control parameters;
 a control information acquiring unit for acquiring control information including installed vehicle information which represents the system properties of the vehicle, including information retained by the chassis control system; and
 a control parameter value changing unit for changing the values of the control parameters based on the control information,
 wherein the control parameter retaining unit retains other control laws dependent on states of the chassis control system, and
 wherein the control parameter value changing unit refers to the installed vehicle information in preference to said another control information retained by the chassis control system when changing the values of the control parameters in a state where the vehicle is at halt or running.

3. A vehicle steering control unit for controlling steering of a vehicle, which is installed on a vehicle including a chassis control system, comprising a computer including:

a control parameter retaining unit for retaining parameters as control parameters that are dependent on system properties of the vehicle in control laws for controlling the steering of the vehicle;

a control execution unit for controlling the steering of the vehicle in accordance with values of the control parameters;

a control information acquiring unit for acquiring control information including installed vehicle information which represents the system properties of the vehicle, including information retained by the chassis control system; and a control parameter value changing unit for changing the values of the control parameters based on the control information, wherein the control information acquiring unit acquires a system constituent element information which is on an element making up a steering system installed on the vehicle as another control information, the control parameter retaining unit retains other control laws which are dependent on the system constituent element information as the control parameters, and the control parameter value changing unit refers to the system constituent element information in preference to the installed vehicle information when changing the values of the control parameters for the first time after the vehicle steering control unit has been installed on the vehicle, and refers to the installed vehicle information in preference to the system constituent element information when changing the values of the control parameters for the second and later times after the vehicle steering control unit has been installed on the vehicle.

4. A vehicle steering control unit as set forth in claim 3, wherein the control parameter retaining unit retains other control laws which are dependent on the information of the chassis control system, and the control parameter value changing unit refers to the installed vehicle information in preference to the information retained by the chassis control system when changing the values of the control parameters for the first time after the vehicle steering control unit has been installed on the vehicle, and refers to the installed vehicle information in preference to the information retained by the chassis control system when changing the values of the control parameters for the second and later times after the vehicle steering control unit has been installed on the vehicle.

5. A vehicle steering control unit as set forth in claim 3, wherein the system constituent element information which is on an element making up a steering system installed on the vehicle, is information concerning the type of steering system installed on the vehicle.

\* \* \* \* \*